No. 738,715. PATENTED SEPT. 8, 1903.
G. H. ELLIS.
PROCESS OF TREATING FLAX STRAW.
APPLICATION FILED MAR. 23, 1901.
NO MODEL.
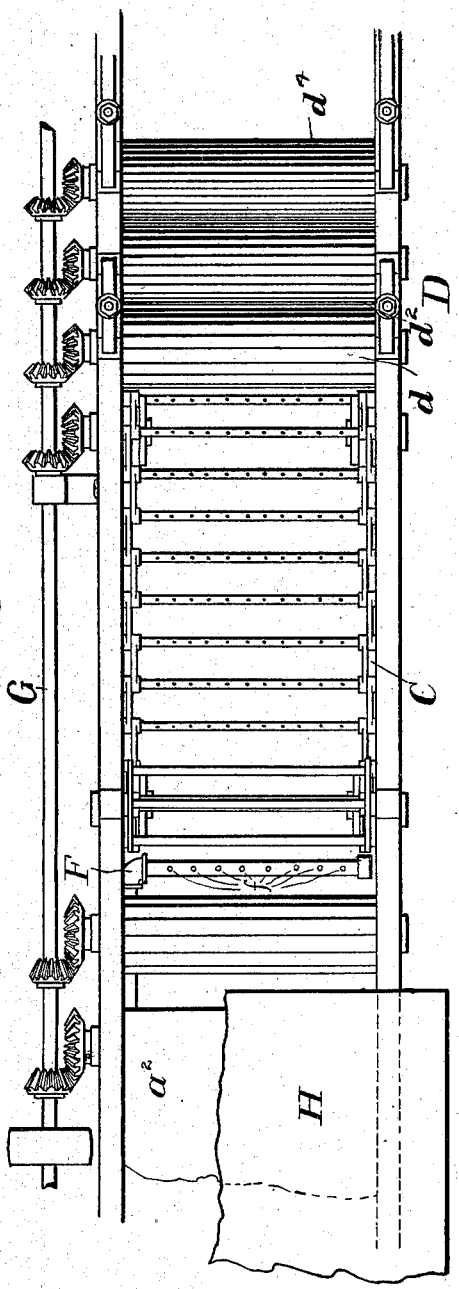
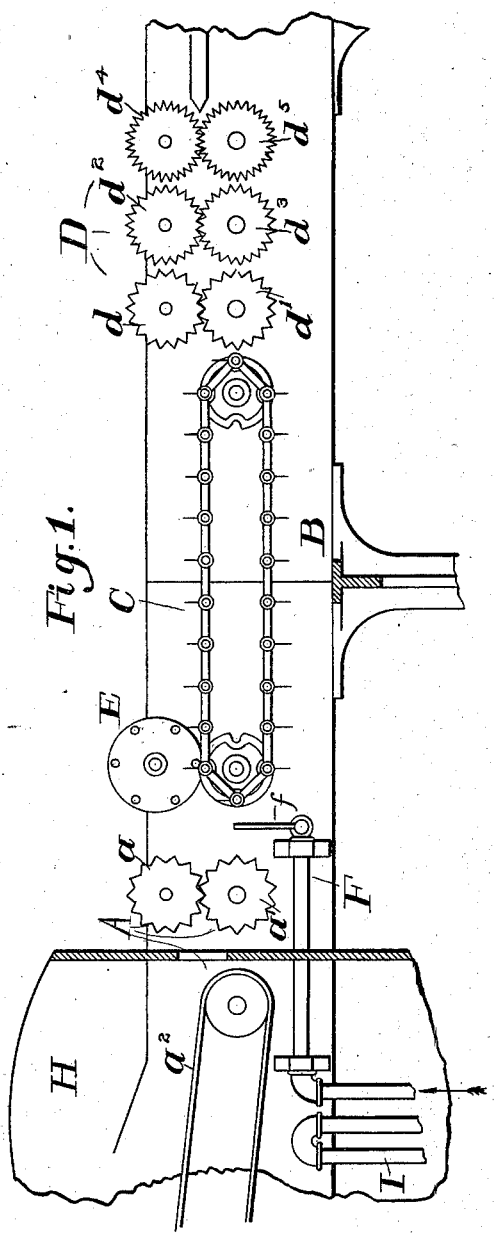
WITNESSES: Wm. A. Dreffein. Pierson W. Banning.
INVENTOR. George H. Ellis. BY Thomas A. Banning, ATTORNEY.

No. 738,715.

Patented September 8, 1903.

UNITED STATES PATENT OFFICE.

GEORGE H. ELLIS, OF CHICAGO, ILLINOIS, ASSIGNOR TO WILLIAM DEERING, OF EVANSTON, ILLINOIS.

PROCESS OF TREATING FLAX-STRAW.

SPECIFICATION forming part of Letters Patent No. 738,715, dated September 8, 1903.

Application filed March 23, 1901. Serial No. 52,485. (No specimens.)

*To all whom it may concern:*

Be it known that I, GEORGE H. ELLIS, a citizen of the United States, residing at Chicago, in the county of Cook and State of Illinois, have invented a new Process of Treating Flax-Straw; and I do hereby declare the following to be a full, clear, and exact description of the process, as well as of the machine I have chosen to carry it into effect, reference being had to the accompanying drawings, which illustrate the machine used by me.

Figure 1 is a side elevation of my machine, and Fig. 2 a plan view of the same.

The object of my invention is to avoid injury of the cortex of the stalk while breaking the woody portions in order that the latter may be sufficiently separated to permit the former being twisted sufficiently to form a strong twine.

In the drawings, A represents the feeding device. It consists in this instance of the rollers $a$ and $a'$ and the endless conveyer $a^2$. The endless conveyer serves merely as a moving part upon which wisps of straw may be laid consecutively by any suitable mechanism, and the rollers $a$ and $a'$ serve not only to aid in advancing the straws, but also to tend to retard them, as circumstances soon to be mentioned require.

B is the bed-frame of the machine. Upon it and supported on suitable shafts and moved thereby is the gill-chain C.

D is a series of breaking-rollers, the pair $d$ and $d'$ having flutings of the usual degree of fineness in flax-breaking machines of the kind shown. The pair $d^2$ and $d^3$ are substantially the same size as the former, but have flutings slightly finer. $d^4$ and $d^5$ constitute another pair of rollers, having flutings somewhat finer still. The rollers $a$ and $a'$, as stated, serve in part as feeding-rollers; but they also serve to retard any straws passing through them until the gill-chains have well secured them. The rate of peripheral speed of the rollers $a$ and $a'$ is comparatively slow, the movement of the gill-chain C somewhat faster, and the peripheral speed of the rollers of the series D is still greater than the rate of movement of the gill-chain. The result of this variation in speeds is as follows: Straws once between the rollers $a$ and $a'$ are moved forward until their ends are engaged by the gill-chain, when the latter by its combing action tends to bring them all to positions parallel with each other. When the gill-chain has engaged the greater portion of the length of the straws, the latter are pulled onward between the rollers $a$ and $a'$, and this action helps to straighten out the portions last to leave the rollers. In other words, the stalks once spread upon the conveyer $a^2$ pass through butt first, and as long as the gill-chain moves faster than they are moved the straightening effect takes place, and as soon as they are sufficiently engaged by the gill-chain to draw them through between the rollers $a$ and $a'$ then straightening of the tops takes place. The final drawing of the straws from the gill-chain by the system of rollers D has a further straightening effect because of the fact that they pull the straws rapidly from the many teeth of said chain. By this means all straws, however irregularly they may have been laid, are brought into line. A reel E may be used to hold the straws in mesh with the teeth of the gill-chain. In order to run the rollers of the feeding device A, the shafts supporting the gill-chain C, and those supporting the rollers of the system D, a shaft G is passed along the side of the frame and provided with bevel-gears which mesh into those of the gill-chain, roller, and endless conveyer.

I provide means whereby the flax-straws may be subjected to a dampening process immediately before the action of breaking takes place in order that the woody portion may remain dry and the cortices of the straws be toughened by said dampening process, also to a drying process before dampening when required. To accomplish dampening the cortices of the straws, I provide the pipe F, having a series of jets $f$ adjacent to the pathway of the straws when passing through the break. The jets may be above, below, or at the sides of the passage. I prefer, however, to put them below and to use saturated steam for producing the result desired. Any kind of atomizer may be used; but I prefer the steam rather than the spray of water. I find that it is desirable to have the woody portion of all the straws equally dry in order that the breaking shall be uniform throughout the mass being operated upon. To accomplish this result, I provide drying apparatus, which may be an oven H of any well-known form, and the conveyer pass through it. The straw may be made to pass over steam-pipes I or it may be kiln-dried before being placed upon the machine; but I prefer to have the drying take place upon the straws while they are moving onward. The feeding device A may consist merely of a slowly-running gill-chain similar in character to the gill-chain C and passing through the drying-chamber H, which, as shown, is partly broken away, which gill-chain takes the place of the conveyer $a^2$ and the rollers $a$ and $a'$ for feeding the material, the delivery end of the chain extending beyond the wall of the drying-chamber. The straightening effect of the two gill-chains will be substantially the same as that of the feeding device A and the gill-chain C, Figs. 1 and 2. The sliver produced by this machine passes off in the usual manner and thence through drawing-frames and finally through a spinner, carding, and thus shortening, being avoided. The desirability of kiln-drying the straws is due to the fact that, however stored, the straws being operated upon are not uniformly dry, the result being that those portions which have been nearest the floor—for instance, in a warehouse—are much more damp than those portions subjected to drafts of air while in store. In passing through an ordinary break the woody portion of damp straws is so tough as not to be well broken and easily separated from the cortices, while with those straws from drier places in a storage-room the woody portion is more easily broken. The importance of dampening the dry straw immediately before breaking may be clearly understood when it is stated that the dampness toughens the cortices, but has not time to penetrate the woody portions and toughen them also. The result of this treatment is to produce a sliver composed of the cortices of the straws, little split and little broken, which when only lightly twisted together form a much stronger twine than can be accomplished with carded flax. By the use of my process the result is more nearly the mere stripping of the cortex from the straws than by any means known to me. My invention is particularly adapted to making twine for binding grain from unretted flax-straw without carding or other processes that shorten the fiber.

What I claim as my invention, and desire to secure by Letters Patent, is—

1. The process of decorticating flax or other fibrous plants which consists in subjecting the straws or stalks to a drying treatment then immediately dampening the cortices, and after dampening the cortices at once breaking the material, the several steps of the process successively following each other, substantially as described.

2. The process of decorticating flax or other fibrous plants which consists in subjecting the straws or stalks to a drying treatment, then to a dampening treatment for toughening the cortices without affecting the woody portions of the straws or stalks which remain dry, and after dampening the cortices immediately breaking the material, the steps of the process occurring in the order named, substantially as described.

3. The process of decorticating flax or other fibrous plants which consists in subjecting the straws or stalks to a drying treatment, then dampening the cortices of the straws or stalks with steam for toughening the cortices without affecting the woody portions of the straws or stalks which remain dry, and after dampening the cortices at once breaking the material before the woody portions are toughened by the action of the steam, substantially as described.

In testimony whereof I affix my signature in the presence of two witnesses.

GEORGE H. ELLIS.

Witnesses:
CHAS. N. CHAMBERS,
JOHN F. STEWARD.